United States Patent [19]

Hall

[11] Patent Number: 5,441,225
[45] Date of Patent: Aug. 15, 1995

[54] WEBBING CLAMP AND RESILIENT HOOP APPARATUS AND METHOD

[76] Inventor: Larry D. Hall, 380 N. 400 East P.O. Box 1010, Morgan, Utah 84050-1010

[21] Appl. No.: 138,700

[22] Filed: Oct. 18, 1993

[51] Int. Cl.$^6$ ............................................. A47F 5/00
[52] U.S. Cl. ............................. 248/231.6; 248/288.5
[58] Field of Search ................... 248/231.6, 181, 229, 248/288.3, 311.2, 313, 104; 24/569, 17 B, 339

[56] References Cited

U.S. PATENT DOCUMENTS

| | | | |
|---|---|---|---|
| 892,105 | 6/1908 | White | 248/288.5 |
| 1,280,013 | 9/1918 | Goddard | 248/288.5 |
| 3,228,639 | 1/1966 | Korns | 248/62 |
| 3,843,083 | 10/1974 | Angiband | 248/229 |
| 4,195,806 | 4/1980 | Berry | 248/70 |

FOREIGN PATENT DOCUMENTS

| | | | |
|---|---|---|---|
| 745256 | 2/1933 | France | 248/229 |
| 2161534 | 1/1986 | United Kingdom | 248/288.3 |

*Primary Examiner*—Leslie A. Braun
*Assistant Examiner*—Catherine S. Collins
*Attorney, Agent, or Firm*—J. Winslow Young

[57] ABSTRACT

A clamp for adjustably mounting an airspeed indicator to a webbing. The clamp is configured as a pair of planar jaws designed to clamp the webbing when tightened by a bolt passing through the jaws. Each jaw includes a socket half so that a socket is created when the jaws are brought together. A resilient hoop is used to encircle the barrel of the airspeed indicator in a resiliently constrictive manner. A ball is mounted to the external periphery of the resilient hoop and is configured to be received in the socket and clamped therein when the jaws are clamped to the webbing.

12 Claims, 2 Drawing Sheets

WEBBING CLAMP AND RESILIENT HOOP APPARATUS AND METHOD

BACKGROUND

1. Field of the Invention

This invention relates to webbing clamps and, more particularly, to a novel webbing clamp and resilient hoop apparatus and method for releasably mounting an airspeed indicator to webbing of a paraglider harness, the resilient hoop being secured to the webbing clamp by a unique ball joint.

2. The Prior Art

Within the past decade or so there has been a significant growth in the sport of paragliding. The name itself is a combination of two words parachute (para) and hang gliding (gliding) and, as the name implies, constitutes the unique sport of manned flight in reliance on the principles of flight embodied in these two sports. Instead of a conventional parachute canopy having a generally hemispherical profile, the paraglider is configured with a wing-like structure from which the pilot is suspended by the shroud lines and webbing support system of the harness. The paraglider wing is configured as an airfoil having individual cells extending transversely across the wing. Each cell includes an opening in the front to allow ram air resulting from the forward motion of the flight to inflate each cell and thereby create the airfoil profile of the paraglider wing.

The pilot in his/her harness is suspended below the paraglider wing by the shroud lines so that there is no rigid structural framework in the paraglider. This means that any airspeed indicator (such as disclosed in my copending patent application Ser. No. 08/065,989 filed May 24, 1993 for AIRSPEED INDICATOR APPARATUS AND METHOD) will be difficult to affix to the paraglider. This is particularly relevant since the webbing of the paraglider harness does not extend from the pilot along normal horizontal and vertical axes. Specifically, the webbing radiates outwardly and upwardly from the pilot at various angles so that even the plane of the webbing itself will be at an angular offset from the foregoing axes. Further, since it is essential that my airspeed indicator is oriented in the proper direction in order to provide an accurate indication of airspeed, it is equally essential that the airspeed indicator is adjustably mountable to the webbing of the paraglider harness. Not only must the airspeed indicator be adjustably secured to the webbing of the paraglider harness, it must also be releasable in the event a shroud line inadvertently becomes snagged across the airspeed indicator. This requirement places a fairly rigorous set of preconditions on any system used to secure an airspeed indicator to the webbing of a paraglider harness.

In view of the foregoing, it would be an advancement in the art to provide a webbing clamp for use in removably, adjustably, and releasably securing an airspeed indicator to the webbing of a paraglider harness. It would also be an advancement in the art to provide an engagement mechanism for releasably engaging the barrel of an airspeed indicator, the engagement mechanism being formed as a hoop of resilient plastic to accommodate the hoop resiliently encircling the barrel of the airspeed indicator. Another advancement in the art would be to provide a ball and socket engagement mechanism between the resilient hoop and the webbing clamp. Such a novel apparatus and method is disclosed and claimed herein.

BRIEF SUMMARY AND OBJECTS OF THE INVENTION

This invention is a webbing clamp and a resilient hoop adjustably secured to the webbing clamp. The webbing clamp is configured to simultaneously clamp a hoop-mounted ball along with a webbing strap of a paraglider harness. The resilient hoop is configured to encircle the barrel of an airspeed indicator in a constrictive force. A ball is affixed to the periphery of the resilient hoop and provides a limited range of orientation of the hoop to accommodate the orientation of the airspeed indicator at a preselected orientation with respect to the direction of flight. The ball is configured as three planar elements along each of the three axes of the ball, each planar element having a circular profile thereby forming a ball-like element with an overall spherical profile for engagement by the webbing clamp.

It is, therefore, a primary object of this invention to provide improvements in clamping systems for releasably and adjustably securing an airspeed indicator to the webbing of a paraglider harness.

Another object of this invention is to provide improvements in the method for releasably and adjustably mounting an airspeed indicator to the webbing of a paraglider harness.

Another object of this invention is to provide a resilient hoop for engagement of the barrel of an airspeed indicator in the absence of other engagement mechanisms.

Another object of this invention is to provide a ball and socket engagement mechanism between the resilient hoop and the webbing clamp.

Another object of this invention is to provide a webbing clamp mechanism designed to release the webbing in the event either the clamp or the airspeed indicator becomes snagged.

These and other objects and features of the present invention will become more readily apparent from the following description in which preferred and other embodiments of the invention have been set forth in conjunction with the accompanying drawing and appended claims.

DETAILED DESCRIPTION OF THE PREFERRED EMBODIMENT

Figure 1:
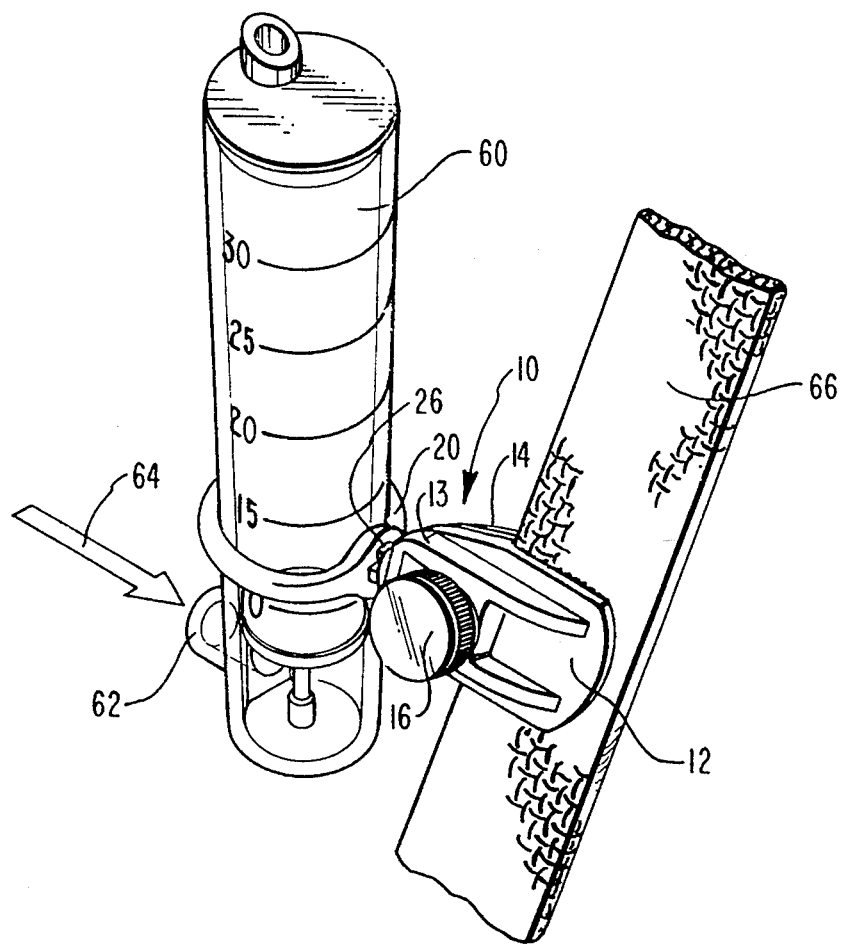
FIG. 1 is a perspective view of the novel webbing clamp and resilient hoop of this invention shown in the environment of a fragment of webbing strap and an airspeed indicator.

The invention is best understood by reference to the drawing wherein like parts are designated by like numerals throughout in conjunction with the following description.

General Discussion

The novel webbing clamp of this invention is designed to secure an airspeed indicator to the webbing of a paraglider harness. The airspeed indicator has a generally cylindrical barrel which is releasably engaged by a resilient hoop. A ball is mounted to an external periphery of the resilient hoop and serves as a "universal joint" for adjustably orienting the resilient hoop to the webbing clamp. Importantly, the webbing clamp not only allows the user to orient the airspeed indicator in any preselected orientation but it is also designed to release from the webbing strap in the event of entanglement by a shroud line or the like. The webbing clamp is configured with two planar jaws secured by a threaded bolt cooperating with a threaded nut. The bolt passes through holes located adjacent the midsection of the jaws. One end of the jaws is designed to engage the webbing while the other end is formed as a socket for receipt of the ball. This configuration allows the user to simultaneously clamp the webbing and the ball after the resilient hoop (and the airspeed indicator engaged thereby) has been suitably oriented in the predetermined direction. Further tightening of the bolt applies a further constrictive action against both the ball and the webbing.

Importantly, the inner faces of the jaws are configured with a patterned gripping surface that engages the webbing but not with sufficient gripping force to preclude the webbing clamp from being pulled off the webbing under sufficient force. This feature is important in the event a shroud line inadvertently becomes entangled with either the airspeed indicator or the webbing clamp. Otherwise, there is a possibility that the airspeed indicator/webbing clamp could cause an accident by entanglement with one or more shroud lines.

Uniformity in the gripping force engagement between the ball and the webbing clamp is assured by fabricating the ball as three intersecting planar elements, one planar element being placed along each axis of the ball. This configuration allows the ball to be fabricated with closer tolerances on its external periphery than would otherwise be possible if the ball were fabricated as a solid element. In particular, since the ball and its appended, resilient hoop are fabricated from a polyurethane using injection molding techniques, a solid ball would be extremely difficult to fabricate with a smooth, external profile due to the inherent nature of a plastic part of any appreciable thickness to shrinkage and "dimpling" upon cooling. My design precludes this problem and provides the ball with an essentially uniform spherical profile overall even though trihedral recesses are formed in the surface of the ball adjacent the intersection of the three, orthogonal, planar elements that constitute the basal structure of the ball.

This ball design provides another benefit over a ball having a solid or continuous external surface in that it allows the resilient ring to be adjustably oriented more easily relative to the webbing clamp since the total surface of the ball in frictional contact with the socket in the webbing clamp is reduced substantially thereby reducing the total frictional forces that would otherwise be encountered if the ball were solid.

As indicated above, the resilient hoop is fabricated from a polyurethane material which means that it is provided with a limited degree of elasticity. This limited elasticity allows the user to engage the airspeed indicator in the resilient hoop in a snug, frictional engagement. Even though the airspeed indicator is thus engaged, it can still be turned relative to the resilient hoop to accommodate alignment of the airspeed indicator.

Detailed Description

Figure 2:
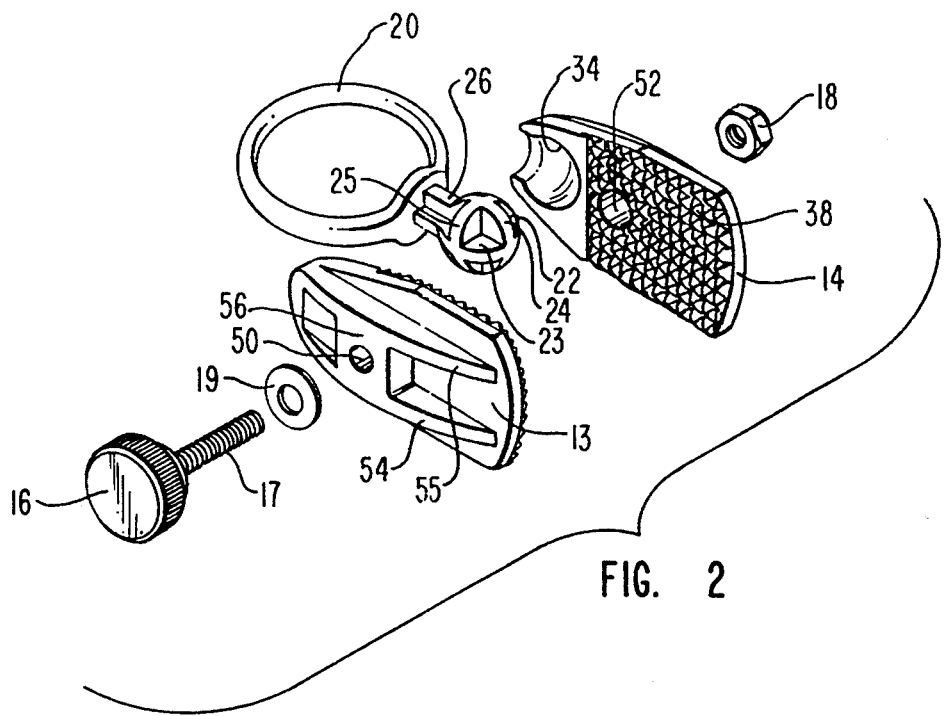
FIG. 2 is an exploded, perspective view of the webbing clamp and resilient hoop.

Referring now to FIGS. 1 and 2, the novel airspeed indicator holder of this invention is shown generally at 10 and includes a webbing clamp 12 and a resilient hoop 20. Webbing clamp 12 has a first jaw 13 and second jaw 14. A bolt 17 passes through a hole 50 in first jaw 13 and a hole 52 in second jaw 14 into threaded engagement with a hexnut 18 to hold first jaw 13 and second jaw 14 together in a clamping relationship against both a webbing strap 66 and a ball 22 to which resilient hoop 20 is affixed.

Figure 5:
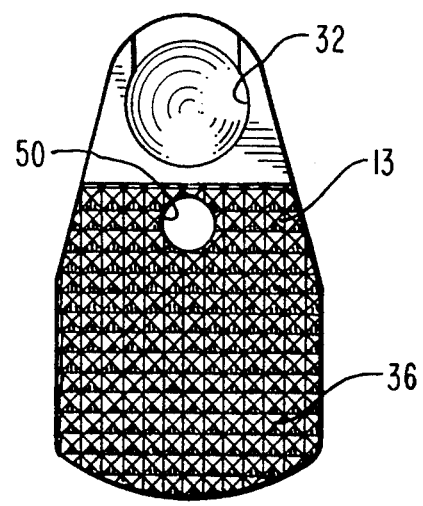
FIG. 5 is a plan view of the gripper surface of the bolt side of the webbing clamp.
Figure 6:
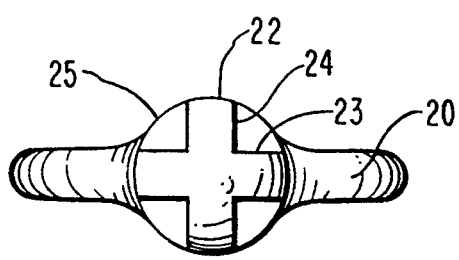
FIG. 6 is an end view of the ball portion of the resilient hoop.

Referring also to FIG. 6, resilient hoop 20 is dimensionally configured to snugly receive the cylindrical barrel of airspeed indicator 60 in a frictional engagement as provided by the resiliency of resilient hoop 20. Resilient hoop 20 is connected to ball 22 by a neck 26. Ball 22 is not a solid, spherical surface but is formed by three, orthogonal elements 23, 24, and 25, each of which has a circular profile so that when joined together they form the overall spherical profile of ball 22. The spaces between orthogonal elements 23–25 are generally trihedral and contribute to the overall spherical uniformity of ball 22 by reducing the overall mass of ball 22 thereby eliminating shrinkage problems in ball 22 as it is produced by injection molding. Orthogonal elements 23–25 also contribute to the utility of airspeed indicator holder 10 by limiting the total surface engagement between ball 22 and the corresponding socket created in webbing clamp 12 by socket half 32 (FIG. 5) and socket half 34. Otherwise, if ball 22 were a solid surface there would by an increased tendency for ball 22 to seize inside socket half 32 and socket half 34 when clamped together by bolt 17.

The foregoing feature of ball 22 is important since it is necessary for the pilot (not shown) to orient the air inlet 62 of airspeed indicator 60 to receive air flow 64 as directly as possible along the axis of air inlet 62. Accordingly, several minor adjustments between the orientation of ball 22 relative to webbing clamp 12 may be necessary in order to achieve optimal alignment between air inlet 62 and air flow 64. A solid ball surface on ball 22 would tend to be in either a free turning relationship or a stuck relationship with webbing clamp 12. As it is, the noncontinuous surface of ball 22 allows a limited degree of frictional movement between ball 22 and webbing clamp 12 even when webbing clamp 12 is affixed to webbing 66. Once the proper alignment of air inlet 62 relative to air flow 64 is achieved, bolt 17 is securely tightened into nut 18 by rotation of knurled head 16. With webbing clamp 12 thus tightened against both webbing 66 and ball 22, the relative orientation of airspeed indicator 60 with respect to both airflow 64 and webbing 66 is achieved.

However, in the event a shroud line (not shown) becomes inadvertently entangled by either airspeed indicator 60 or webbing clamp 12, webbing clamp 12 is designed to allow it to be forcibly removed from webbing 66. In particular and with reference also to FIG. 5, first jaw 13 has a gripping surface 36 while second jaw has a gripping surface 38. Gripping surfaces 36 and 38 are designed to engage the woven surface of webbing 66 without damaging the same while at the same time permitting webbing clamp 12 to be forcibly removed therefrom.

Figure 3:
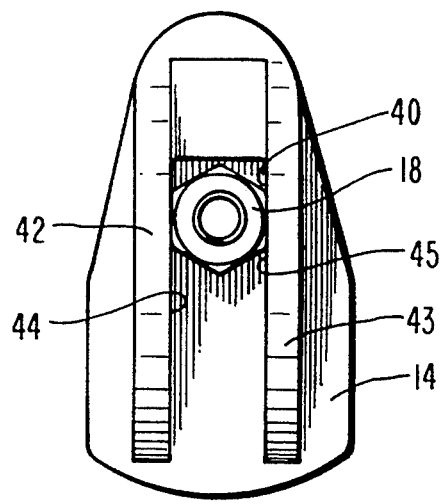
FIG. 3 is a plan view of the outer face of the nut side of the webbing clamp.
Figure 4:
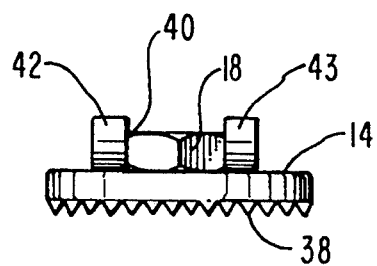
FIG. 4 is an end view of the nut side of the webbing clamp.

First jaw 13 also includes spaced reinforcement or raised ridges 54 and 55 with a raised surface 56 therebetween. Hole 50 passes through raised surface 56. Raised ridges 54 and 55 along with raised surface 56 contribute to the overall strength of first jaw 13. Correspondingly, second jaw 14 (see also FIGS. 3 and 4) includes raised ridges 42 and 43 in spaced relationship on the back of second jaw 14. A recess 40 is provided between raised ridges 42 and 43 and is further defined by a pair of opposing ribs, ribs 44 and 45. The dimensions of recess 40 are preselected so as to receive nut 18 therein in a snap-fit relationship. In this manner, nut 18 is held in recess 40 of second jaw 14 with the threaded bore thereof held in alignment with hole 52.

Bolt 17 is configured as a standard bolt having knurled head 16 thereon for ease in finger-tightening or loosening bolt 17 with respect to nut 18. A washer 19 serves as a bearing surface between knurled head 16 and raised surface 56 to prevent knurled head 16 from damaging first jaw 13 when bolt 17 is firmly tightened into nut 18 to cause webbing clamp 12 to simultaneously and securely engage both ball 22 and webbing 66.

The Method

The novel method of this invention includes preparing resilient ring 20 from a resilient plastic such as a polyurethane and affixing a ball 22 thereon to serve as a ball for a ball and socket relationship with webbing clamp 12. Advantageously, the resilient nature of resilient ring 20 allows it to be stretched incrementally to accommodate the insertion of airspeed indicator 60 therein. Once inserted, airspeed indicator 60 is grasped by the constrictive force of the resilient nature of resilient ring 20. This constrictive force holds airspeed indicator 60 at the desired orientation until changed by the pilot (not shown).

Webbing clamp 12 is mounted to ball 22 by enclosing ball 22 in the socket formed between socket half 32 and socket half 34. Bolt 17 is then passed through washer 19 and holes 50 and 52 before being threadedly engaged to nut 18. Webbing 66 is clamped between gripping surfaces 36 and 38 before bolt 17 is tightened completely into nut 18. Knurled head 16 is then securely tightened to achieve a simultaneous securement of ball 22 and webbing 66 by webbing clamp 12. Prior to firmly tightening of knurled head 16, the final alignment of air inlet 62 and adjustment of webbing clamp 12 relative to webbing 66 is accomplished. Thereafter knurled head 16 is securely tightened to securely affix the orientation of airspeed indicator 60 relative to webbing 66.

Even though this relative orientation between airspeed indicator 60 and webbing 66 is affixed for normal operating conditions, an inadvertent snagging of airspeed indicator 60 by a shroud line (not shown) will preferentially cause webbing clamp 12 to slide off webbing 66 rather than allow airspeed indicator 60 to otherwise entangle the shroud line. This is an important safety feature for the sport of paragliding since it eliminates what could otherwise be a potentially disastrous condition.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A clamp for adjustably affixing an airspeed indicator to a webbing strap comprising:
   an elastic hoop adopted to have a diameter incrementally smaller than the diameter of the airspeed indicator, said elastic hoop being operable for stretchably receiving the airspeed indicator in a constrictive, frictional relationship;
   a ball mounted to said elastic hoop;
   a webbing clamp;
   having a first jaw, said first jaw having a first socket half at a first end and
   a second jaw, said second jaw having a second socket half at a first end, said second jaw cooperating with said first jaw in a face-to-face relationship to engage said ball between said first socket half and said second socket half;
   release means on said webbing clamp for releasably mounting said webbing clamp to the webbing strap, said release means comprising a first gripping face on a surface of a substantially planar portion of on a second end of said first jaw and a second gripping face has been inserted after "a second gripping face" on a second end of said second jaw, said webbing clamp adopted to releasably the webbing strap between said first gripping face and said second gripping face when said ball is engaged between said first socket half and said second socket half;
   said webbing clamp having a hole through said first jaw and said second jaw; and
   screw means passing through said hole for bringing said first jaw toward said second jaw, said screw means causing said first jaw and said second jaw to simultaneously engage said ball and the webbing strap in a clamping relationship.

2. The clamp defined in claim 1 wherein said ball comprises three orthogonally intersecting planar elements, each planar element having a circular profile to unitedly form a spherical profile of said ball, said planar elements reducing shrinkage discontinuities in said ball during injection molding of said ball and limiting frictional engagement between said ball and said socket.

3. The clamp defined in claim 1 wherein said first jaw comprises a first back, said first back having a plurality of raised first ribs and a raised platform, said raised platform receiving said hole through said first jaw, and said second jaw comprises a second back, said second back having a plurality of raised second ribs with a receptacle between said raised second ribs, said receptacle receiving a threaded nut therein in snap-fit relationship and said hole in alignment with said threaded nut.

4. A clamp comprising:
   a first jaw having a first back and a first socket half at a first end;
   a second jaw having a second back and a second socket half at a first end;
   release means for releasably mounting said clamp to a webbing strap, said release means comprising a first planar face on a second end of said first jaw and a second planar face on a second end of said second jaw, said first planar face having a first gripping surface and said second planar face having a second gripping surface, said first gripping surface and said second gripping surface adapted to releasably engage the webbing strap therebetween;

a first hole through said first jaw;

a second hole through said second jaw;

bolt means passing through said first hole and said second hole for urging said first planar face against said second planar face with said first socket half and said second socket half forming a socket between said first jaw and said second jaw;

a ball configured to be received in clamping relationship in said socket; and an elastic hoop mounted to said ball and said ball being mounted in said socket whereby said elastic hoop extends outwardly from said clamp when said ball is in said socket.

5. The clamp defined in claim 4 wherein said second jaw comprises a nut receptacle on said second back, said nut receptacle receiving a threaded nut therein in a snap-fit relationship, said receptacle holding said nut in alignment over said second hole.

6. The clamp defined in claim 4 wherein said ball comprises three orthogonally disposed planar elements oriented along orthogonal axis, each planar element having a dimensionally equal circular profile thereby providing said ball with a spherical profile.

7. The clamp defined in claim 4 wherein said elastic hoop is adopted to have an inside diameter incrementally less than the external diameter of an airspeed indicator thereby enabling said resilient hoop to releasably grasp the airspeed indicator.

8. The clamp defined in claim 4 wherein said first back and said second back comprise raised ribs to increase the rigidity of said first jaw and said second jaw.

9. A method of releasably supported an airspeed indicator on a webbing strap comprising the steps of:

mounting a ball to an elastic hoop;

preparing a clamping means for releasably securing said ball to the webbing strap, said preparing step comprising forming a first jaw and a second jaw, said first jaw having a first socket half at a first end and a first, planar gripping face at a second end, said second jaw having a second socket half at a first end and a second, planar gripping face at a second end, providing a screw means on said clamping means for bringing said first jaw in juxtaposition with said second jaw and forming a socket with said first socket half and said second socket half;

engaging said ball in said socket;

releasably clamping said jaws to the webbing by engaging the webbing strap between said first, planar gripping face and said second, planar gripping face frictionally engaging the airspeed indicator in said elastic hoop.

10. The method defined in claim 9 wherein said mounting step comprises forming said ball with recesses therein, said recesses defining said ball as three orthogonally intersecting planar elements, each planar element having a dimensionally equal circular profile, said recesses reducing shrinkage deformities of said ball during injection molding of said ball and also limiting frictional engagement between said ball and said socket.

11. The method defined in claim 9 wherein said step of providing a screw means comprises bringing said first jaw and said second jaw together by passing said screw means through said first jaw and said second jaw and tightening said screw means in a threaded nut.

12. The method defined in claim 11 wherein said step of providing a screw means includes releasably securing said threaded nut on a back surface of said second jaw thereby precluding losing said threaded nut.

* * * * *